United States Patent
Kalampoukas et al.

(10) Patent No.: US 6,438,101 B1
(45) Date of Patent: Aug. 20, 2002

(54) METHOD AND APPARATUS FOR MANAGING CONGESTION WITHIN AN INTERNETWORK USING WINDOW ADAPTATION

(75) Inventors: Lampros Kalampoukas, Eatontown; Kadangode K. Ramakrishnan, Berkeley Heights, both of NJ (US); Anujan Varma, Santa Cruz, CA (US)

(73) Assignees: AT&T Corp., New York, NY (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/085,954

(22) Filed: May 27, 1998

Related U.S. Application Data

(60) Provisional application No. 60/068,670, filed on Dec. 23, 1997.

(51) Int. Cl.[7] .......................... G01R 31/08; H04L 12/56
(52) U.S. Cl. .................. 370/229; 370/235; 370/395.43; 370/401
(58) Field of Search ................................ 370/229, 231, 370/235, 252, 255, 352, 358, 395, 397, 398, 400, 401, 428, 469, 412, 413, 395.43; 709/234, 235

(56) References Cited

U.S. PATENT DOCUMENTS

| | | | |
|---|---|---|---|
| 5,650,993 A | * | 7/1997 | Lakshman et al. |
| 5,748,901 A | * | 5/1998 | Afek et al. ............. 395/200.68 |
| 6,076,114 A | * | 6/2000 | Wesley ........................ 709/235 |
| 6,092,115 A | * | 7/2000 | Choudhury et al. ......... 709/235 |
| 6,151,300 A | * | 11/2000 | Hunt et al. .................. 370/231 |

OTHER PUBLICATIONS

*Controlling TCP/IP Bandwidth*, TCP/IP Bandwidth Management Series, vol. 1, No. 1, The Packeteer Technical Forum, 1997, pp. 1–12.

*TCP Flow Control with ACR Information*, ATM/ 97–0758R1, Source: NTT Labs, Arata Koike, NTT Multimedia Networks Laboratories, Nov. 30–Dec. 5, 1997, Singapore, pp. 1–11.

S. Jagannath and N. Yin, "End–to–End Traffic Management Issues in IP/ATM Internetworks," *IETF Network Working Group*, Aug. 1997, Internet Draft, Work in Progress, pp. 1–19.

* cited by examiner

*Primary Examiner*—Alpus H. Hsu
*Assistant Examiner*—Duc Ho

(57) ABSTRACT

Congestion is controlled in an internetwork having at least two segments coupled by a router where at least one connection between communication devices passes through the router. Each connection is assumed to use a window-based flow control protocol between its source and destination. On receiving an acknowledgment from a connection in the router, where the acknowledgment contains a window size set by the destination, the router adaptively determines a second window size for the connection based on the router's average buffer occupancy and its instantaneous buffer occupancy. If the window size in the acknowledgment exceeds this second window size, the window size in the acknowledgment is overwritten to select the second window size. The router then forwards the acknowledgment to the source, thereby controlling the window size available to the source as a function of the congestion in the router.

27 Claims, 5 Drawing Sheets

METHOD AND APPARATUS FOR MANAGING CONGESTION WITHIN AN INTERNETWORK USING WINDOW ADAPTATION

CROSS-REFERENCES TO RELATED APPLICATIONS

This application claims the benefit of U.S. Provisional Application No. 60/068,670, filed Dec. 23, 1997, the entire contents of which are incorporated herein by reference.

GOVERNMENT CONTRACT

This invention was made with Government support under Contract No. F19628-96-C-0038 from the Advanced Research Projects Agency (ARPA) and under NSF Young Investigator Award No. MIP-9257103. The Government has certain rights in this invention.

BACKGROUND OF THE INVENTION

The present invention relates generally to the field of telecommunications. More specifically, the present invention relates to congestion control mechanisms in an internetwork using window adaptation.

Congestion occurs in a packet network when the requirements of the source(s) exceed the transport capability of the network or the reception capability of the receiver. For example, congestion occurs when multiple senders transmit packets to a network switch faster than the switch can forward the packets. Congestion results in the loss of packets due to a lack of buffering space in the switch.

Congestion control in a packet network is often performed using a window-based protocol between the source and destination. For example, congestion control in the current Internet is performed primarily by the Transmission Control Protocol (TCP). The TCP protocol uses a flow control algorithm between the sender and the receiver, where acknowledgments (acks) from the receiver are used to adjust a sliding window for the sender. Rather than sending a packet and waiting for an acknowledgment (ack) from the receiver before sending another packet, the sender keeps track of the total number of unacknowledged packets sent and continues to transmit packets as long as the number of unacknowledged packets does not exceed a specified window size. This window size determines the maximum number of packets that a receiver permits the sender to send to the receiver so that in the worst case, even if all the packets arrived at the receiver from the sender at once, the packets would not be lost at the receiver. The overall network capacity, however, can present a lower limit to the amount of traffic that can be handled. The sender determines the capacity of the network by probing the communication network to determine the network's capacity and accordingly adjusts the window size. As long as there is no loss, the window size is gradually increased. When a loss occurs, the window size is reduced. Subsequently, the window size is expanded slowly. The sender can identify that a packet has been lost due to congestion either by the arrival of duplicate acks indicating a loss or by the absence of an ack being received within a timeout interval. This entire process of controlling the window size to limit congestion is known as flow control.

An important aspect of TCP congestion control mechanisms is that they do not assume any support from the network for explicit signaling of the congestion state. TCP infers the congestion state of the network from the arrival of acks, timeouts, and receipt of duplicate acks.

A number of compensation schemes can be used to reduce the window size upon detection of congestion and to gradually increase the window size back to the edge of congestion free operation. Such compensation schemes include the slow-start algorithm, fast-retransmit, and fast recovery. These schemes are described in detail in *TCP/IP Illustrated, Vol. I, by Richard Stevens, Addison Wesley,* 1994, which reference is incorporated by reference herein.

For example, under the slow-start algorithm, if the window size was one hundred packets when congestion was detected, the TCP protocol reduces the window size to one; the lost packet(s) is then retransmitted and the window size is expanded by one upon receipt of each subsequent acknowledgment, i.e., the indication of successful receipt of the transmitted packet at the destination.

The fast-retransmit mechanism improves upon the slow-start algorithm described above. The fast-retransmit mechanism retransmits a packet when three duplicate acks are received at the source, without waiting for the timeout period to expire. The reception of three duplicate acks is interpreted as a congestion indication. When three duplicate acks arrive, the fast-recovery algorithm reduces the window size by half rather than the more severe reduction to a window size of one as in the slow-start algorithm.

These known congestion mechanisms, however, are problematic when used in an internetwork containing a combination of rate-controlled and non-rate-controlled segments. Such an internetwork can include, for example, a set of TCP-based end systems attached to non-rate-controlled network segments running the Internet Protocol (IP), with these segments, in turn, interconnected by a rate-controlled Asynchronous Transfer Mode (ATM) network segment. In the absence of congestion-related losses, the TCP congestion window grows up to the maximum window size permitted by the destination. Rate control in the rate-controlled segment enables the maintenance of small queue lengths in the ATM switches within the ATM segment. The rate of the TCP traffic, however, may not be matched precisely to the rate provided by the ATM segment. Consequently, most of the packets transmitted within a given TCP window are buffered in the routers coupling the rate-controlled segment to the non-rate-controlled segments. Severe congestion and degraded throughput can result due to packet losses at the router.

One known system, Packet Shaper by Packeteer, Inc, provides rate control to alleviate congestion resulting from bursty traffic within a network using TCP. This system intercepts TCP acks and delays the forwarding of these acks while also substituting a different window size so that what would otherwise be bursty traffic flow is changed to smooth traffic flow. This system does not disclose the specific manner in which the TCP window size is updated. This known system attempts to avoid the excessive buffering at the router which would otherwise cause packet loss at the router.

It would be beneficial to avoid excessive buffering at the router, which would otherwise cause packet loss, without delaying the forwarding of acks and without modifying the TCP protocol semantics.

SUMMARY OF THE INVENTION

The present invention can control congestion in an internetwork having at least one controlled network segment and at least one non-rate-controlled network segment coupled by a router to prevent large queues of packets from accumulating in the router thereby potentially causing congestion and buffer overflows in the routers. The window size of connections passing through the routers are controlled based on the congestion level in the routers, so as to control the flow of packets into the internetwork, thereby controlling congestion. This results in improved throughout and fairness in the internetwork while minimizing losses due to buffer overflows in the routers.

The window size of a connection passing through a router can be explicitly controlled by the router by modifying the acknowledgments returned by the destination of the connection to its source. Connection-level state information need not be maintained in the router; knowledge of the bandwidth available to the connection or the delay incurred by its packets in the internetwork is not necessary. This is particularly applicable to connections using the Transmission Control Protocol (TCP), and is compatible with existing TCP implementations.

When a router receives an acknowledgment belonging to a connection passing through it, the router adaptively determines a second window size for the connection based on the buffer occupancy of the router. If the window size that is specified within the acknowledgment exceeds the second window size that is adaptively determined by the router, the window-size field in the acknowledgment is overwritten to select the second window size. The router then forwards the acknowledgment to the source of the connection. The source of the connection, in turn, can adjust the flow of packets into the internetwork based on the window size specified in the acknowledgments, thus adapting to changes in the congestion level at the router.

DETAILED DESCRIPTION

Figure 1:
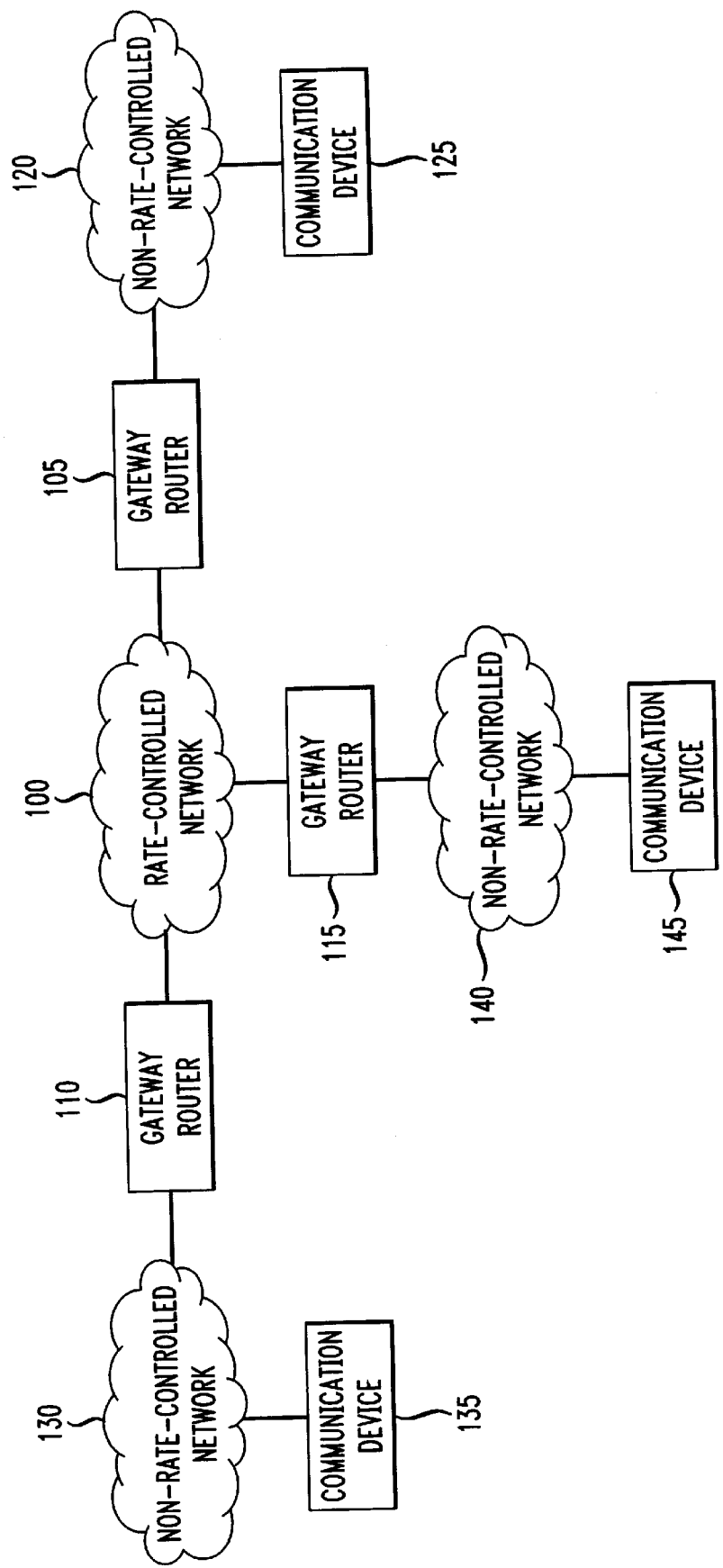
FIG. 1 shows an internetwork having a rate-controlled network connected to several non rate-controlled networks, according to an embodiment of the present invention.

FIG. 1 shows an internetwork having a rate-controlled network segment connected to several non rate-controlled network segments, according to an embodiment of the present invention. Rate-controlled network 100 is connected to gateway routers 105, 110 and 115. Gateway router 105 is connected to non-rate-controlled network 120, which is in turn connected to communication device 125. Gateway router 110 is connected to non-rate-controlled network 130 which is in turn connected to communication device 135. Gateway router 115 is connected to non-rate-controlled network 140 which is in turn connected to communication device 145. Note that the interconnected rate-controlled network and the non-rate-controlled networks are also referred to herein interchangeably as network segments within an internetwork.

Rate-controlled network 100 is any type of communication network where the rate of data traffic is controlled based on the number of packets that may be transmitted per unit of time. Rate-controlled network 100 can be a connection-oriented or a connectionless network. For example, rate-controlled network 100 can be an Asynchronous Transferred Mode (ATM) network using a protocol that controls the flow rate of data traffic. For example, where rate-controlled network 100 is an ATM network, the ATM network can use different grades of service such as an available bit rate (ABR) service, a constant bit rate (CBR) service, or a variable bit rate (VBR) service. These protocols are examples where the flow rate of data traffic is controlled.

Non-rate-controlled networks 120, 130 and 140. can be any type of connectionless data network. For example, non-rate-controlled networks 120, 130 and 140 can be network segments running the Internet Protocol (IP). Where non-rate-controlled networks 120, 130 and 140 are IP networks, these networks can use, for example, the transmission control protocol (TCP) to control the flow of the data traffic transmitted within these networks. Alternatively, these networks can use, for example, the Decbit protocol used in DECnet networks, or any other protocol that controls flow of data between the source and destination using a window-based flow-control mechanism.

Gateway routers 105, 110 and 115 are any type of router that connects and controls the flow of traffic between a rate-controlled network and a non-rate-controlled network. Gateway routers 105, 110 and 115 control the transmission rate for each connection to rate-controlled network 100. For example, gateway router 105 controls the bidirectional traffic between non-rate-controlled network 120 and rate-controlled network 100.

Communication devices 125, 135 and 145 can be any of a variety of types such as a computer or a network terminal. Communication devices 125, 135 and 145 transmit and receive information through their corresponding non-rate-controlled network, the corresponding gateway router, and the rate-controlled network 100. The term "information" as used herein is intended to include data which can represent, for example, text, voice, audio, video and multimedia.

Figure 2:
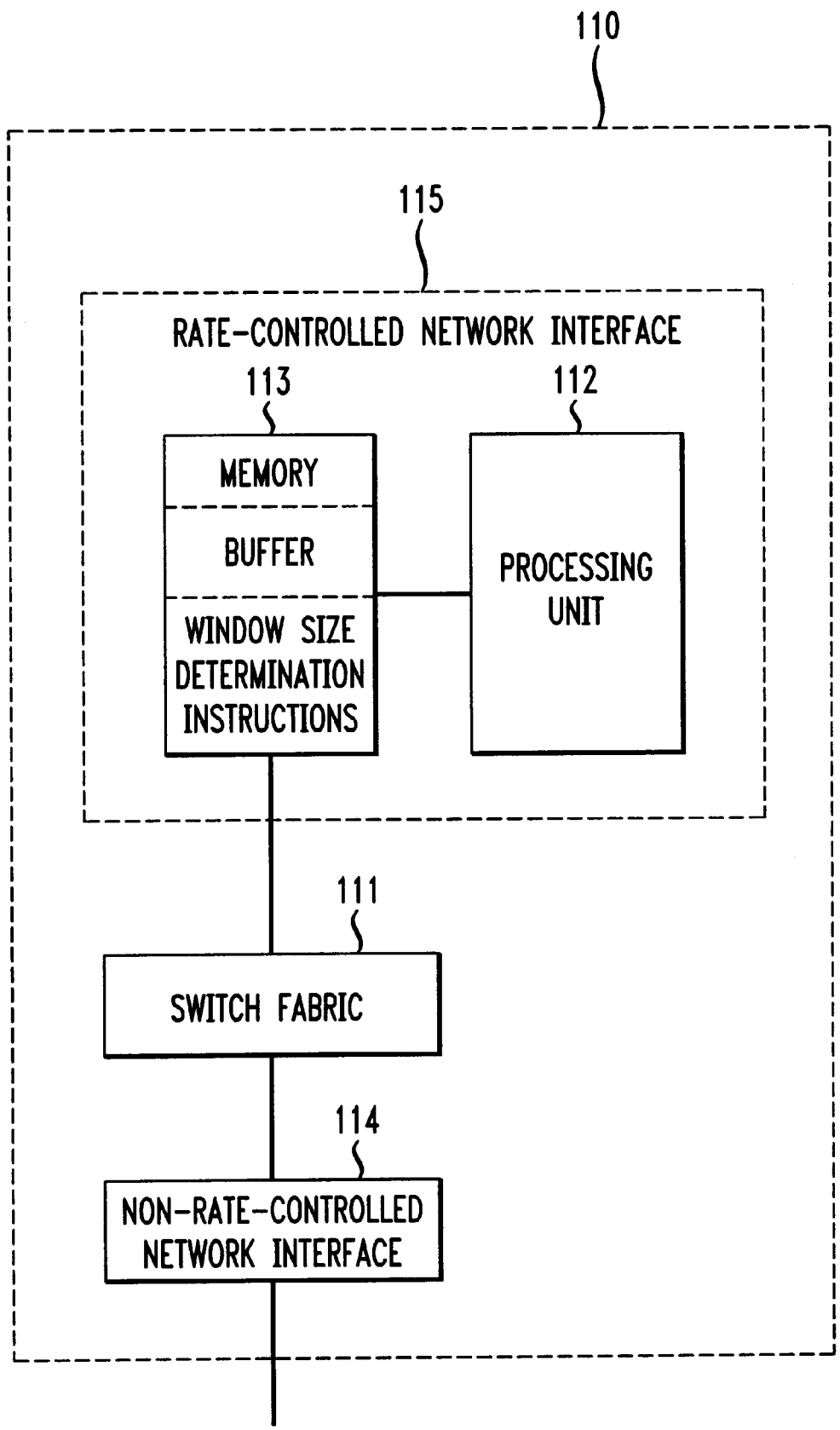
FIG. 2 illustrates a configuration of a gateway router, according to an embodiment of the present invention.

FIG. 2 illustrates a configuration of a gateway router, according to an embodiment of the present invention. Although FIG. 2 illustrates the configuration for gateway router 110 specifically, the configuration would be applicable for gateway routers 105 and 115.

Gateway router 110 can include switch fabric 111 which is coupled to memory 113, non-rate-controlled network interface 114 and rate-controlled network interface 115. Switch fabric 111 is the internal switching fabric for gateway router 110 and can be, for example, a backplane bus, a crossbar switch, or any other medium that can provide the required connectivity. Rate-controlled network interface 115 can include memory 113 and processing unit 112. Memory 113 can include at least one buffer where excess data traffic is queued until it can be output to and/or from rate-controlled network interface 115. For example, a buffer can store excess data traffic outbound for rate-controlled network 100 and another buffer can store excess data traffic inbound from rate-controlled network 100. Memory 113 can also include window size determination instructions as described below in more detail, which when executed by processor unit 112 allow gateway router 110 to adjust the transmitted congestion window size associated with a received ack. Memory 113 can also include other instructions as appropriate for gateway router 110. For example, memory 113 can include instructions that ensure source communication devices within rate-controlled network 100 will transmit data at the rate specified by that network segment.

Non-rate-controlled network interface 114 of gateway router 110 can be coupled to non-rate-controlled network 130. Rate-controlled network interface 115 can be coupled to rate-controlled network 100. As gateway router 110 receives data traffic, for example, from rate-controlled network 100 through rate-controlled network interface 115, that data traffic is transmitted through switch fabric 111 and routed to non-rate-controlled network interface 114. This data traffic can then be forwarded to non-rate-controlled network 130. Similarly, data traffic received from non-rate-controlled network 130 can be forwarded to rate-controlled network 100.

Returning to FIG. 1, the following discussion for the sake of convenience, will consider traffic being sent on the internetwork from a source located at communication device 135 and a destination located at communication device 125. The source at communication device 135 can send traffic through non-rate-controlled network 130, gateway router 110, rate-controlled network 100, gateway router 105, non-rate-controlled network 120 and then to communication device 125 where the destination is located. The following discussion also can apply to any combination of destinations and sources located at various communication devices where the corresponding data traffic has to travel through a non-rate-controlled network to a rate-controlled-network and then to a second non-rate-controlled network.

Figure 3:
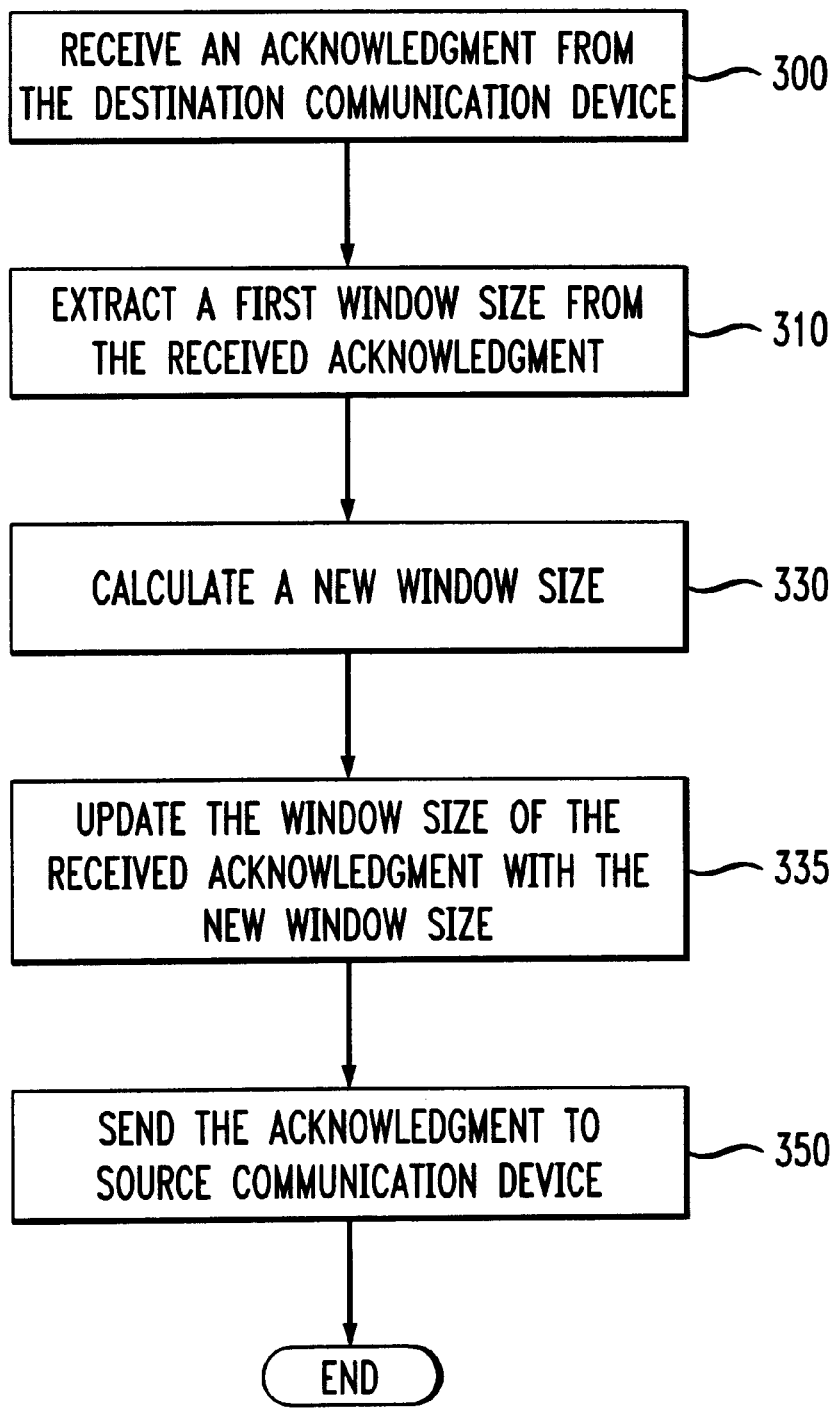
FIG. 3 shows a flowchart of the method performed within a router according to an embodiment of the present invention, upon receipt of an acknowledgment from a connection passing through the router.

FIG. 3 shows a flowchart of the method performed within router 110, according to an embodiment of the present invention, upon receipt of an acknowledgment for a connection passing through the router. This process is described in further detail in *Congestion Management in High Speed Networks*, PhD. Dissertation by Lampros Kalampoukas, University of California Santa Cruz, and is incorporated by reference herein.

At step 300, an ack from the destination communication device is received at the gateway router that is located within the internetwork where congestion would typically occur when a window-based flow control protocol, such as the Transmission Control Protocol (TCP), is used between the source and the destination. Congestion would occur typically at the gateway router due to the mismatch between the instantaneous TCP window size of the source which is interfaced to the non-rate-controlled network and the end-to-end bandwidth-delay product of the internetwork between the source and the destination. This mismatch can occur because the TCP protocol gradually increases the window size beyond the end-to-end bandwidth-delay product of the internetwork so that the buffer at the gateway router overflows and a loss indication is provided to the source. The source must then adapt its window.

For example, consider the case where the destination is located at communication device 125 and the source is located at communication device 135. As the TCP window size gradually increases, the TCP window size will exceed the end-to-end bandwidth-delay product and congestion will occur at gateway router 110. The end-to-end bandwidth-delay product in this example is evaluated between destination communication device 125 and source communication device 135. The data traffic arriving at gateway router 110 is bursty in nature due to the window flow control of TCP. The bursty data traffic arriving at gateway router 110 from non-rate-controlled network 130 cannot be routed to rate-controlled network 100 in a timely manner especially due to the mismatch in the two mechanisms for flow control. As excess data traffic fills the memory buffer of gateway router 110, data packets are dropped at gateway router 110 under conventional congestion-control mechanisms and conventional packet drop policies, for example, Random Early Detection (RED) described in *Random Early Detection Gateways for Congestion Avoidance*, by S. Floyd and V. Jacobson, IEEE/ACM *Transaction on Networking*, vol. 1, no. 4, August 1993, pp. 397 413; and the Drop-from-front policy described in *The Drop from Front Strategy in TCP and in TCP over ATM*, by T. V. Lakshman, A. Neidhardt, and T. J. Ott, *Proceedings of IEEE INFOCOM '96*, vol. 3, March 1996, pp. 1242–50.

Note that the buffer memory 113 can be shared among multiple traffic streams. When the rate-controlled network 100 is a virtual-circuit-based network, for example, an Asynchronous Transfer Mode (ATM) network, each virtual circuit can carry multiple TCP connections.

As described below in reference to steps 330 and 335, the buffer occupancy of gateway router 110 is controlled by rewriting the window size of an ack with a new window size. When an ack arrives at gateway router 100 on its way to the source at communication device 135, the share of the individual TCP connection's buffer is compared to the window size in the ack. If the window size of the ack is larger than the TCP connection's buffer at gateway router 110, then the window size of the ack is rewritten by gateway router 110 with a new window size corresponding to a fair share of the buffer.

At step 330, a new window size is calculated. The new window size can be calculated using a nonlinear function as appropriate for the particular internetwork and window-based flow control protocol used in the internetwork. For example, the new window size at time t, $W_r'(t)$, can be calculated using a logarithmic function, such as the following equation:

$$W_r'(t) = \max(\min(W_r(t), \alpha(t)\log_2(B-Q(t))), MSS),$$

where, $W_r(t)$ is a first window size as specified within an ack received by the router at time t, $\alpha(t)$ is the feedback coefficient at time t, B is the total buffer space, Q(t) is the buffer occupancy at time t (also referred herein as instantaneous buffer occupancy), and MSS is the largest allowed packet size among all connections passing through the router. In other words, the first window size, $W_r(t)$, is the window size in the ack received by gateway router 110. The new window size, $W_r'(t)$, is the window size in the ack forwarded by gateway router 110 to the source communication device 135.

The ack received by gateway router '110 can have a window size equal to and unmodified from the advertised window size of destination communication device 125. In other words, a router can receive an ack having a window size equal to window size originally sent by a destination.

Alternatively, the ack received by the gateway router can have a window size different from the destination's advertised window size. The window size of the ack received at a router can differ from the destination's advertised window size due to an intervening router that previously modified the window size of the ack using the method described in reference to FIG. 3. In other words, a destination communication device can send a ack having an advertised window size to the source through multiple routers in series; a first router receiving the advertised window size in the returning ack can modify that window size and then forward the modified ack to a second router. The second router can then further modify the window size of the returning ack and then forward that further modified ack to the source.

Because setting the new window size, $W_r'(t)$, smaller than the maximum packet size, MSS, negotiated during connection establishment between the rate-controlled network and the non-rate-controlled networks can lead to starvation and deadlocks, the new window size should not be less than the maximum segment size, MSS.

The feedback function, $\alpha(t)\log_2(B-Q(t))$, can largely control the dynamics of the system; the calculation of the feedback coefficient, $\alpha(t)$, is described below in connection with FIG. 4. The feedback function can provide all TCP connections with similar feedback and cause the TCP connections to operate with equal windows.

The memory buffer at a gateway router can be allocated without resulting in large over-correction by having the computed feedback function change rather slowly compared to the actual amount of empty space in the memory buffer. In general, having the computer feedback function change rather slowly allows the congestion-management process at the gateway router to reach a steady state.

The logarithmic aspect of the feedback function for estimating the new window size is in accordance with the differences in TCP behavior when a TCP connection is in the congestion avoidance phase and when in the slow start phase. A TCP connection in congestion avoidance phase increases the window size by one every round-trip between a source and a destination. A TCP connection in slow start phase doubles the window size every round trip between the source and the destination. The slow start phase allows a TCP connection to rapidly ramp up to the point where the round-trip connection is filled. Beyond this point, any further increases in the window size can result in a gradual accumulation of packets at the memory buffer of the gateway router causing a bottleneck.

By using a logarithmic function to compute the feedback function, all TCP connections behave as if they are in the congestion avoidance phase, especially when the gateway router's buffer occupancy is large. In other words, the TCP connections that are in slow start phase each increase their window slower than otherwise expected so that the new window size for each of these TCP connections is approximately equivalent to the window increase rate expected if the TCP connections are in the congestion avoidance phase. Consequently, if some TCP connections for a given virtual circuit were in the slow-start phase but some other TCP connections sharing the same virtual circuit are in a congestion avoidance phase, the logarithmic aspect of the feedback function can cause all of the TCP connections for that virtual circuit to act as if they were in the congestion avoidance phase thereby avoiding over-correction.

The new window size calculated in step 330 can be used for multiple returning acks to source communication devices, without regard to which of the particular TCP connections the acks belong. In other words, all TCP connections can be treated equally. Consequently, the number of active TCP connections or their corresponding states in the gateway router need not be observed and maintained.

In the case where one TCP connection is not using its allocated window, the buffer occupancy will be reduced at the gateway router thereby causing an increase in the window size signaled to the remaining TCP connections. Consequently, active TCP connections will share the available bandwidth substantially equally and have increased throughput.

At step 335, the ack from which the first window size was extracted in step 310 is updated with the new window size determined in step 330. At step 350, the processed ack is forwarded by the gateway router to the source communication device. In other words, gateway router 110 forwards the ack received from the destination communication device 125, after executing the processing steps in FIG. 3, to the source communication device 135. Note that the ack may be forwarded to the source communication device 135 directly or indirectly through other routers each one of which can modify the window size of the acknowledgment according to the process described in connection with FIG. 3.

Figure 4:
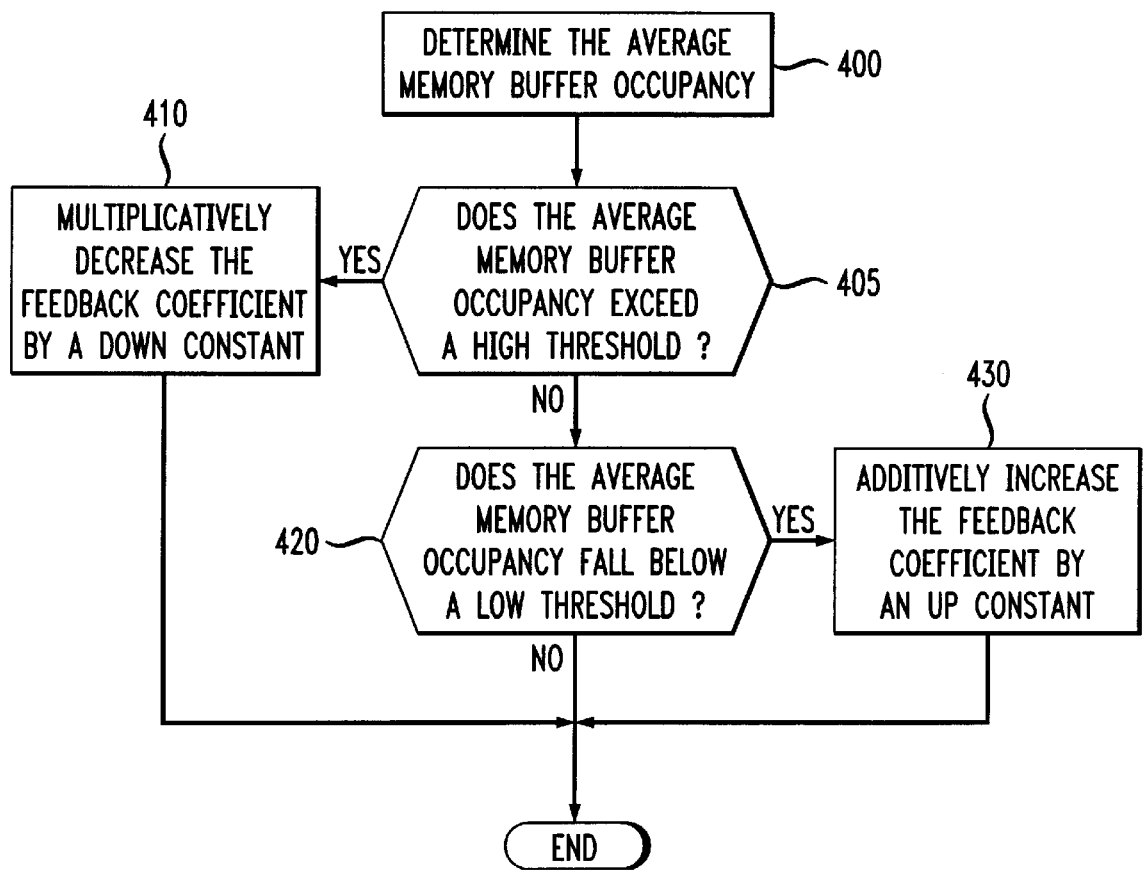
FIG. 4 shows a flowchart for determining the feedback coefficient, according to an embodiment of the present invention.

FIG. 4 shows a flowchart for determining the feedback coefficient, according to an embodiment of the present invention. Note that the process described in reference to FIG. 4 for determining the feedback coefficient is performed every update interval, T, unlike the process described in reference to FIG. 3 which is performed upon the receipt of each ack. For example, the feedback coefficient can be updated every 10 milliseconds (i.e., update interval, T, equals 10 milliseconds) while an ack may be received every millisecond or so. Consequently, when the new window size is calculated in step 330 of FIG. 3 upon the arrival of an ack, the feedback coefficient used in calculating the new window size is based on the process described in connection with FIG. 4.

At step 400, the average memory buffer occupancy of memory 113 is determined by the router using window determination instructions. The average buffer occupancy, $\overline{Q}(t)$, is determined by the following equation:

$$\overline{Q}(t)=(1-g)\overline{Q}(t-)+gQ(t),$$

wherein, g is a gain, $\overline{Q}(t-)$ is an average buffer occupancy of memory 131 previous to time t, and $Q(t)$ is an instantaneous buffer occupancy of memory 113 at time t.

The gain, g, has a fractional value between 0 and 1, for example, 1/128.

Once the average buffer occupancy, $\overline{Q}(t)$, has been determined, a new window size can be determined using a logarithmic feedback function adaptively determined using a feedback coefficient, $\alpha(t)$. As described below in reference to steps 405, 410, 420 and 430, the feedback coefficient, $\alpha(t)$, is adapted based on the average memory buffer occupancy of memory 113 of gateway router 110 using two thresholds. The feedback coefficient, $\alpha(t)$, is adapted to maintain the buffer occupancy between these two thresholds (i.e., using hysteresis). In other words, when the buffer occupancy goes above the high threshold, the combined window sizes of all the sources associated with the gateway router are too large and the feedback coefficient, $\alpha(t)$, is reduced. When the buffer occupancy is between the high threshold and the low threshold, the feedback coefficient remains unchanged. When the buffer occupancy goes below the low threshold, the link may be underutilized and, therefore, the feedback coefficient, $\alpha(t)$, is increased.

Note that this newly determined window size applies to all of the TCP connections being routed through and sharing the allocated memory of gateway router 110. Consequently, this newly determined window size applies to all of the TCP connections sharing a particular virtual circuit.

At conditional step 405, the average memory buffer occupancy, $\overline{Q}(t)$, is compared to a high threshold. The high threshold can have a value of, for example, sixty percent (60%) of the total available buffer space. If the average memory buffer occupancy exceeds the high threshold, then the process proceeds to step 410. If the average memory buffer occupancy does not exceed the high threshold, then the process continues at conditional step 420.

At step 410, the feedback coefficient, $\alpha(t)$, is multiplicatively decreased by a down constant, $\omega_{down}$. In other words, the feedback coefficient is adjusted by $\omega_{down}$ so that $\alpha(t)$ has an adjusted value of $\alpha(t) \cdot \omega_{down}$. This has the effect that when buffer 113 of gateway router 110 exceeds the high threshold, the steady state occupancy of the buffer is reduced to within a desired range. This reduction in the steady state occupancy occurs rapidly because of the multiplicative reduction in the feedback coefficient, $\alpha(t)$, and is appropriate given the possibility of sudden increase in buffer occupancy in a bursty traffic environment.

The down constant, $\omega_{down}$, can have a value of, for example, 31/32. An update interval, T, can have a value of, for example, 10 milliseconds. The update interval, T, is the period time between which the buffer is sampled to determine a new value for the feedback coefficient, $\alpha(t)$. Alternatively, rather than sampling the buffer and determining a new value for the feedback coefficient periodically, these can be performed in a non-periodic manner. For example, the buffer can be sampled on every arrival of an ack. Although the periodic update interval, T, will be referred to herein generally, sampling the buffer and determining the feedback coefficient can be performed in either a periodic or non-periodic manner.

The multiplicative decrease in the feedback coefficient can enable the buffer occupancy to be reduced rapidly thereby preventing overflow in the event of a sudden increase in the number of data packets being stored in the memory buffer. For example, the sudden increase in the number of data packets being stored in memory buffer 113 of gateway router 110 can be due to a reduction in the available bandwidth in rate-controlled network 100 due to a large number of TCP connections becoming active or due to other traffic sharing the internetwork being allocated.

At conditional step 420, the average memory buffer occupancy, $\overline{Q}(t)$, is compared to a low threshold. The low threshold can have a value of, for example, twenty percent (20%) of the total available buffer space. If the average memory buffer occupancy, $\overline{Q}(t)$, falls below the low threshold, then the process proceeds to step 430. If the average memory buffer occupancy, $\overline{Q}(t)$, does not fall below the low threshold, then the process for determining the feedback coefficient ends.

At step 430, the feedback coefficient, $\alpha(t)$, is additively increased by an up constant, $\omega_{up}$. In other words, the feedback coefficient, $\alpha(t)$, is increased by $\omega_{up}$ so that $\alpha(t)$ has an adjusted value of $\alpha(t)+\omega_{up}$. This has the effect that when buffer 113 of gateway router 110 falls below the low threshold, the steady state occupancy of the buffer is allowed to be increased to within the desired range. This increase in the steady state occupancy occurs gradually because of the additional increase in the feedback coefficient, $\alpha(t)$.

The up constant, $\omega_{up}$, can have a value of, for example, ⅛. The additive increase in the feedback coefficient can enable the number of packets queued in memory buffer 113 to be slowly increased so that the buffer occupancy can be increased to be within a desired operating range.

The high threshold and low threshold used in steps 410 and 430, respectively, introduce hysteresis that modifies the feedback coefficient, $\alpha(t)$, so that the buffer occupancy is brought within a desired range. In other words, adapting the value of the feedback coefficient, $\alpha(t)$, based on the buffer occupancy prevents under-utilization when only a small number of TCP connections are active and the round-trip delay is long: if the value of the feedback coefficient, $\alpha(t)$, is quite small so that the sum of the feedback sent to the TCP connections sharing the memory buffer of the gateway router is small, the average buffer occupancy will drop below the low threshold. As a result, the feedback coefficient, $\alpha(t)$, will increase until the buffer occupancy is within the desired range. Similarly, when a large number of TCP connections become active, the buffer occupancy can increase beyond the high threshold; consequently, the value of the feedback threshold, $\alpha(t)$, will decrease thereby bringing the steady state buffer occupancy within the desire range.

Figure 5:
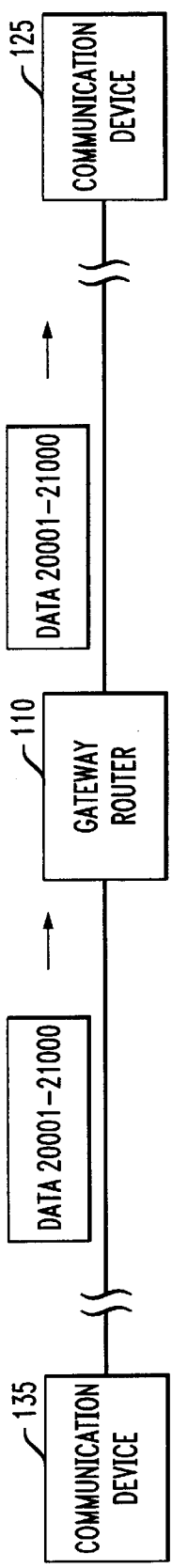
FIGS. 5 through 8 show examples of the acks sent and received in the congestion-control process described in FIGS. 3 and 4, according to an embodiment of the present invention.

FIGS. 5 through 8 show examples of the acks sent and received in the congestion-control process described in FIGS. 3 and 4, according to an embodiment of the present invention. As shown in FIG. 5, the source located at communication device 135 sends a set of data packets through gateway router 110 to the destination located at communication device 125. The set of data packets has a corresponding byte range, 20001–21000. In other words, the first byte of the data packets is indicated by 20001 and the last byte of the data packets is indicated by 21000. In this case, the data packets comprise 1000 bytes of data.

Figure 6:
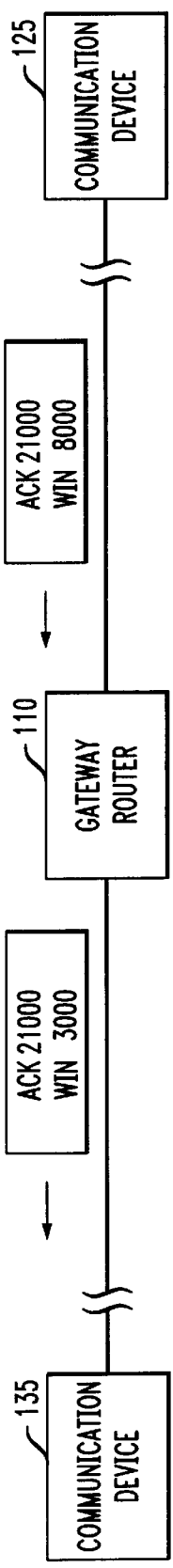

As shown in FIG. 6, in the case where destination communication device 125 successfully receives the data packets with a byte range of 20001–21000, it sends an ack for the packet having byte 21000 with a window size value of, for example, 8000 bytes. The destination-provided window size reflects the available buffer for the TCP connection at destination communication device 125. The ack received at gateway router 110 is processed according to the steps described in reference to FIGS. 3 and 4. Gateway router 110 can calculate a new window size of, for example, 3000 bytes. The value of this new window size is based on the available buffer at gateway router 110 and the available bandwidth within rate-controlled network 100. Gateway router 110 then modifies the ack for the packet having byte 21000 with the new window size of 3000 bytes and sends that modified ack to source communication device 135.

Figure 7:
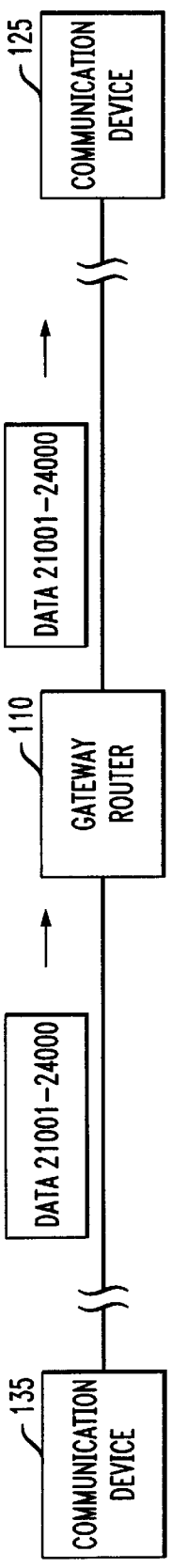

As shown in FIG. 7, source communication device 135 sends data packets with a byte range 21001–24000 based on the new window size of 3000 bytes received in FIG. 5B. Gateway router 110 relays the data packets having the byte range of 21001–24000 to destination communication device 125.

Figure 8:
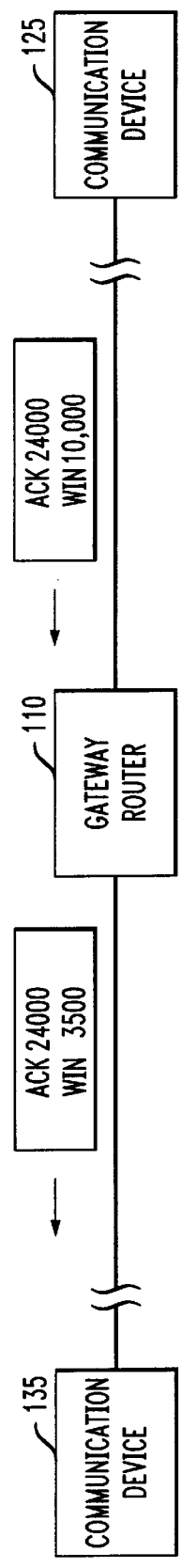

As shown in FIG. 8, in the case where destination communication device 125 successfully receives the data packets with the byte range 21001–24000, it sends an ack for the data packet having byte 24000 a window size value 10000 bytes. This destination-provided window size reflects the available buffer for the TCP connection at destination communication device 125. This ack and window size received at gateway router 110 are then evaluated using the process described in reference to FIGS. 3 and 4. Gateway router 110 can calculate a new window size of, for example, 3500 bytes. Gateway router 110 then modifies the ack for the packet having byte 24000 with the new window size of 3500 bytes and sends that modified ack to source communication device 135. The value of this new window size is based on the available bandwidth within rate-controlled network 100 at that time.

The process illustrated by FIGS. 5 through 8 can of course be repeated as necessary to transmit appropriate data from the source at communication device 135 to the destination at communication device 125.

It should, of course, be understood that while the present invention has been described in reference to a particular system configuration and process, other system configurations and processes should be apparent to those of ordinary skill in the art. For example, embodiments of the present invention can include any number of communication devices, gateway routers, rate-controlled networks and/or non-rate-controlled networks.

What is claimed is:

1. A method for controlling congestion in an internetwork having a first segment and a second segment coupled by a router, the internetwork having a connection between a source and a destination, comprising the steps of:
    (a) receiving at the router a first acknowledgment associated with the connection, the first acknowledgment indicating a first window size for the connection based on an advertised window size of the destination;
    (b) adaptively determining a second window size associated with the connection based on an average buffer occupancy and an instantaneous buffer occupancy of the router, the second window size being not greater than the first window size; and
    (c) sending from the router the second acknowledgment indicating the second window size, wherein the average buffer occupancy is a function of average buffer occupancy just before time T, and instantaneous buffer occupancy at the time T.

2. The method of claim 1, wherein:
    the internetwork has a plurality of connections passing through the router including the connection between the source and the destination; and
    the second window size, $W_r'(t)$, is determined by the following:

$$W_r'(t)=\max(\min(W_r(t), \alpha(t)\log_2(B-Q(t))), MSS)$$

wherein,
    $W_r(t)$ is the first window size at time t,
    $\alpha(t)$ is a feedback coefficient at time t,
    B is a total buffer space,
    Q(t) is an instantaneous buffer occupancy at time t, and
    MSS is a maximum allowed packet size among the plurality of connections passing through the router.

3. The method of claim 2, wherein, when the average buffer occupancy of the router falls below a low threshold, the feedback coefficient, $\alpha(t)$, is increased by a first constant.

4. The method of claim 2, wherein, when the average buffer occupancy of the router falls below a low threshold, the feedback coefficient, $\alpha(t)$, is increased additively by a first constant.

5. The method of claim 2, wherein, when the average buffer occupancy of the router exceeds a high threshold, the feedback coefficient, $\alpha(t)$, is reduced by a second constant.

6. The method of claim 2, wherein, when the average buffer occupancy of the router exceeds a high threshold, the feedback coefficient, $\alpha(t)$, is reduced multiplicatively by a second constant.

7. The method of claim 1, wherein the average buffer occupancy at time t, $\overline{Q}(t)$, is determined by the following:

$$\overline{Q}(t)=(1-g)\overline{Q}(t-)+gQ(t),$$

wherein,
    g is a gain,
    $\overline{Q}(t-)$ is the average buffer occupancy just before time t, and
    Q(t) is an instantaneous buffer occupancy at time t.

8. The method of claim 1, wherein the connection is included in a virtual circuit having a plurality of connections, and wherein the second window size determined in said step (b) is associated with the plurality of connections.

9. The method of claim 1, wherein the first segment is a non-rate-controlled Internet Protocol (IP) network using the Transmission Control Protocol (TCP).

10. The method of claim 1, wherein the second segment is a rate-controlled, Asynchronous Transfer Mode (ATM) network.

11. The method of claim 1, wherein the second segment is a rate-controlled, Asynchronous Transfer Mode (ATM) network controlling a plurality of data rates based on an available bit rate.

12. The method of claim 1, wherein the second segment is a rate-controlled, Asynchronous Transfer Mode (ATM) network controlling a plurality of data rates based on a constant bit rate.

13. The method of claim 1, wherein the second segment is a rate-controlled, Asynchronous Transfer Mode (ATM) network controlling a plurality of data rates based on a variable bit rate.

14. A method for controlling congestion in an internetwork having a first segment and a second segment coupled by a router, the internetwork having a connection between a source and a destination, comprising the steps of:
    (a) receiving at the router a first acknowledgment associated with the connection, the first acknowledgment indicating a first window size for the connection based on a window size of the destination;
    (b) adaptively determining a second window size associated with the connection using a logarithmic function based on an average buffer occupancy and an instantaneous buffer occupancy of the router, the second window size being not greater than the first window size; and
    (c) sending from the router the second acknowledgment indicating the second window size, wherein the average buffer occupancy is a function of average buffer occupancy just before time T, and instantaneous buffer occupancy at the time T.

15. A method for controlling congestion in an internetwork having a first segment and a second segment coupled by a router, the internetwork having a connection between a source and a destination, comprising the steps of:
    (a) receiving at the router a first acknowledgment associated with the connection, the first acknowledgment indicating a first window size for the connection based on a window size of the destination;
    (b) adaptively determining a second window size associated with the connection using a nonlinear function based on an average buffer occupancy and an instantaneous buffer occupancy of the router, the second window size being not greater than the first window size; and
    (c) sending from the router the second acknowledgment indicating the second window size, wherein the average buffer occupancy is a function of average buffer occupancy just before time T, and instantaneous buffer occupancy at the time T.

16. An apparatus for controlling congestion on a connection between a source and a destination within an internetwork having a first segment and a second segment, comprising:
    a first interface to be coupled to the first segment of the internetwork and through which data is sent and received, said first interface having:

a memory buffering data traffic when necessary; and
a processor unit coupled to the memory;
a second interface to be coupled to the second segment of the internetwork and through which data is sent and received; and
a switch fabric coupled to said first interface and said second interface;
said memory storing window size determination instructions adapted to be executed by said processor to:
(a) receive a first acknowledgment associated with the connection, the first acknowledgment indicating an advertised window size for the connection based on an advertised window size of the destination,
(b) adaptively determine a second window size associated with the connection based on the average buffer occupancy and an instantaneous buffer occupancy of said memory, the second window size being not greater than the first window size, wherein the average buffer occupancy is a function of average buffer occupancy just before time T, and instantaneous buffer occupancy at the time T and
(c) send the second acknowledgment indicating the second window size.

17. The apparatus of claim 16, wherein:

The internetwork has a plurality of connections passing through said apparatus including the connection between the source and the destination;

and the second window size, $W_r'(t)$, is determined by the following:

$$W_r'(t) = \max(\min(W_r(t), \alpha(t)\log_2(B-Q(t))), MSS)$$

wherein, $W_r(t)$ is the first window size at time t, $\alpha(t)$ is the feedback coefficient at time t, B is a total buffer space, $Q(t)$ is an instantaneous buffer occupancy at time t, and MSS is a maximum allowed packet size among the plurality of connections passing through said apparatus.

18. The apparatus of claim 17, wherein, when the average buffer occupancy of the memory falls below a low threshold, the feedback coefficient, (t), is increased additively by a first constant.

19. The apparatus of claim 17, wherein, when the average buffer occupancy of the memory exceeds the high threshold, the feedback coefficient, (t), is reduced multiplicatively by a constant.

20. The apparatus of claim 16, wherein the average buffer occupancy at time t, $\overline{Q}(t)$, is determined by the following:

$$\overline{Q}(t) = (1-g)\overline{Q}(t-) + gQ(t),$$

wherein, g is a gain, $\overline{Q}(t-)$ is the average buffer occupancy just before time t, and $Q(t)$ is an instantaneous buffer occupancy at time t.

21. The apparatus of claim 16, wherein the connection is included in a virtual circuit having a plurality of connections, and wherein the determined second window size is associated with the plurality of connections.

22. The apparatus of claim 16, wherein the first segment is a non-rate-controlled, Internet Protocol (IP) network using the Transmission Control Protocol (TCP).

23. The apparatus of claim 16, wherein the second segment is a rate-controlled, Asynchronous Transfer Mode (ATM) network.

24. The apparatus of claim 16, wherein the second segment is a rate-controlled, Asynchronous Transfer Mode (ATM) network controlling a plurality of data rates based on an available bit rate.

25. The apparatus of claim 16, wherein the second segment is a rate-controlled, Asynchronous Transfer Mode (ATM) network controlling a plurality of data rates based on a constant bit rate.

26. The apparatus of claim 16, wherein the second segment is a rate-controlled, Asynchronous Transfer Mode (ATM) network controlling a plurality of data rates based on a variable bit rate.

27. An apparatus for controlling congestion on a connection between a source and a destination within an internetwork having a rate-controlled segment and a non-rate-controlled segment, comprising:

means for receiving from the rate-controlled segment a first acknowledgment associated with the connection, the first acknowledgment indicating a first window size for the connection based on an advertised window size of the destination;

means for buffering excess data associated with the connection;

means for adaptively determining a second window size associated with the connection based on the average buffer occupancy and an instantaneous buffer occupancy of said buffering means, the window size, wherein the average buffer occupancy is a function of average buffer occupancy just before time T, and instantaneous buffer occupancy at the time T being not greater than the first window size; and means for sending the second acknowledgment indicating the second window size to the non-rate-controlled segment of the internetwork.

* * * * *